A. REGAS, W. HERRMANN & A. MOSER.
WATER COCK.
APPLICATION FILED JULY 9, 1912.
1,071,462.
Patented Aug. 26, 1913.
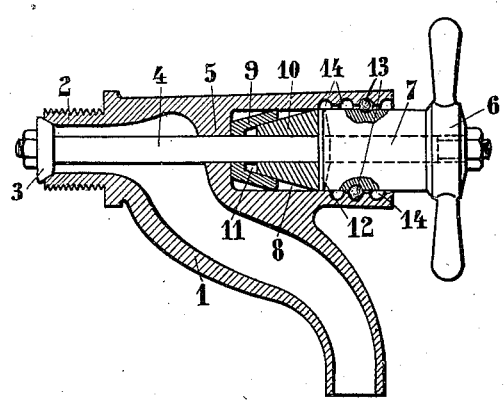
Witnesses=
W. T. Williams
F. Cornwall
Inventors.
Albert Regas, Walter Herrmann,
Albert Moser.
Jno. Muirie
Attorney.

UNITED STATES PATENT OFFICE.

ALBERT REGAS, OF JESTETTEN, GERMANY, AND WALTER HERRMANN, OF FLURINGEN, AND ALBERT MOSER, OF NEUHAUSEN, SWITZERLAND.

WATER-COCK.

1,071,462.  Specification of Letters Patent.  Patented Aug. 26, 1913.

Application filed July 9, 1912. Serial No. 708,509.

*To all whom it may concern:*

Be it known that we, ALBERT REGAS, a subject of the German Emperor, and resident at Jestetten, Grand Duchy of Baden, Germany, WALTER HERRMANN, a citizen of Switzerland, and resident at Fluringen, Zurich, Switzerland, and ALBERT MOSER, a citizen of Switzerland, and resident at Neuhausen, Schaffhausen, Switzerland, have invented certain new and useful Improvements in Water-Cocks, of which the following is a specification.

This present invention relates to water-cocks and more particularly to self-tightening water-cocks and has for its object to provide a cock of this kind, which is simple in construction and efficient in operation.

A further object of the invention is to provide a self tightening water-cock, wherein the stem of the valve is not tightened by a stuffing-box as heretofore, but by means of india rubber members, said valve-stem itself being moved without screw-threads in ball-races.

In the accompanying drawings we have illustrated one form of construction of this invention.

In the construction shown the casing or body 1 of the cock is provided with an externally screw-threaded extension 2, by means of which the cock may be easily screwed into the water-pipe. Arranged within the extension 2 is a seat for the valve-disk 3, secured to a stem 4, extending through a partition 5 of the body 1 of the cock and carrying a handle 6 at the end projection outwardly beyond the body 1. The handle 6 is provided with a boss 7 extending into a bore 8 of the body 1. Mounted upon the valve-stem 4 are two cone-shaped india rubber members 9 and 10, one (9) of which has a beveled recess 11, into which extends the cone 10. Arranged between the latter and the boss 7 is a washer 12. The boss 7 is provided with two notches, each of which contains a ball 13, engaging a worm-groove 14 provided on the inner face of the bore 8. By turning the handle 6, the stem 4 will be moved longitudinally bringing the valve-disk 3 away from its seat to enable liquid to flow through the body 1. When the valve is opened, the elastic members 9 and 10 will be tightly pressed upon the valve-stem 4 and against the wall of the bore 8, so that leakage along the valve-stem 4 is avoided. The more the valve is opened, the stronger will be the pressure, so that the cock will be practically and perfectly tightened. Upon releasing the handle, the pressure of the water upon the valve 3, combined with the pressure exerted by the elastic action of the members 9 and 10 in Fig. 1, or 15 in Fig. 2, tend to rotate the valve stem and close the valve, the pitch of the threads 14 being such as to effect a slow closing of the valve by means of the balls 13 traveling therein. Owing to the use of a ball or balls 13 the frictional engagement will be reduced to a minimum.

The tightening member or members may be made of any suitable shape or form.

We claim:

In a faucet, the combination with a casing, of a valve at the supply end thereof, a stem for said valve, a partition in the casing, a head on said valve stem, a cone-shaped elastic member inclosing said valve stem adjacent the valve stem head, a frusto-conical elastic member inclosing said valve stem adjacent the partition, a cut out portion upon said frusto-conical member adapted to receive the cone shaped member, whereby a movement of the valve stem toward the partition will force the members together and cause them to bear tightly against the casing.

In testimony whereof we have hereunto set our hands in presence of two witnesses.

ALBERT REGAS.
WALTER HERRMANN.
ALBERT MOSER.

Witnesses:
AUGUST RUEGG,
MARTIN PLANDA.

---

Copies of this patent may be obtained for five cents each, by addressing the "Commissioner of Patents, Washington, D. C."